D. L. WINTERS.
KEY.
APPLICATION FILED APR. 19, 1918.

1,277,164.

Patented Aug. 27, 1918.

UNITED STATES PATENT OFFICE.

DAVID L. WINTERS, OF PHILADELPHIA, PENNSYLVANIA.

KEY.

1,277,164.  Specification of Letters Patent.  Patented Aug. 27, 1918.

Application filed April 19, 1918. Serial No. 229,578.

*To all whom it may concern:*

Be it known that I, DAVID L. WINTERS, a citizen of the United States, residing at Philadelphia, in the county of Philadelphia and State of Pennsylvania, have invented certain new and useful Improvements in Keys, of which the following is a specification.

This invention relates to improvements in keys and more particularly to switch keys adapted for use on automobiles and the like.

The primary object of the invention is to provide a key a portion of which may be readily removed and placed in the lock whereby to render such lock inoperative by a key the corresponding portion of which has not been removed.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Figure 1:
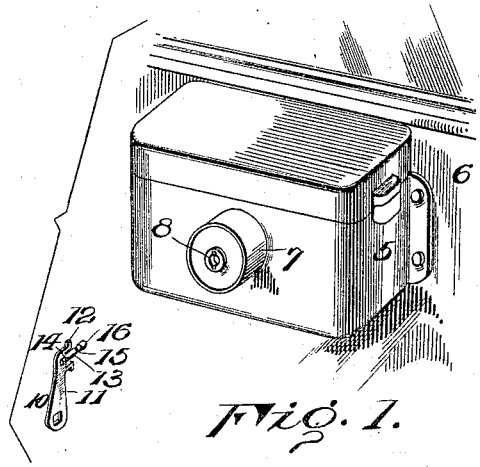
Figure 1 is a perspective view showing the switch lock of an automobile together with the key adapted to be used therewith.

While the present invention will be hereinafter described with relation to a particular type of key adapted for use in connection with switch locks of automobiles, it is of course to be understood that without material modification the invention may be applied to other forms of keys adapted for use in other types of locks.

Referring now to the drawings in detail, 5 denotes the usual switch box adapted to be mounted upon a dash-board 6 of an automobile and provided with lock or switch mechanism 7 having a key hole adapted to be engaged by a key 10.

Figure 3:
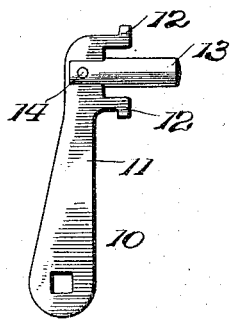
Fig. 3 is a side elevation of a key as now manufactured or before being reformed to embody the present invention.

The particular type of key now in use is shown more clearly in Fig. 3 and embodies a handle 11 with lugs 12 at each side of a central cylindrical member 13, which may be separately secured to the handle 11 by rivet 14 or obviously formed integral therewith if so desired.

Figure 2:
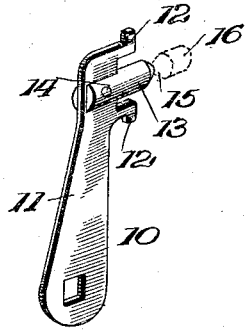
Fig. 2 is a perspective view of the key after being used.
Figure 4:
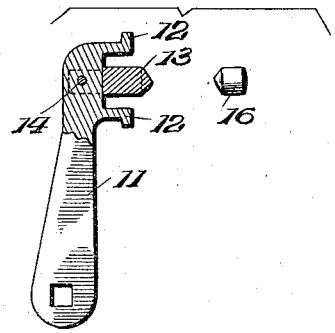
Fig. 4 is a partial sectional elevational view together with the part adapted to be left in the switch after operation.

This cylindrical member 13 is provided with a circumferential notch, better viewed in Fig. 2, to provide an end portion 16 which may be easily broken away from the part 13 and inserted in the lock, thereby to leave the portion 16 in the key hole, thereafter as more clearly illustrated in Fig. 4. By leaving this portion 16 in the key hole it is of course clear that other keys now in general use and of that type generally shown in Fig. 3 cannot be inserted in the lock to obtain effective operation thereof and, furthermore, the key as shown in Fig. 4 will be operative in any lock in which there is a portion, of the same size as the broken off portion 16, already in said lock. It is the intention of this invention that the groove 9 may be placed anywhere along the member 13 as desired.

It will therefore be seen that the present invention provides a simple and practical key and method adapted to insure to a reasonable extent the individual use of a lock with a complementary severed portion therein, thereby eliminating to a certain extent the possibilities of a car being stolen to which this invention is applied or used without the consent of the owner when the key is removed from the lock.

While I have shown the frangible or part to be broken away as applied to a non-workable portion of the key, as 13, it is to be understood that such part might consist of a workable portion of a key, the unsevered portion of the key complementing the severed portion in the lock and working therewith when the key is inserted in the lock.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. A key of the character set forth comprising lock members, one of which is provided with a portion adapted to be severed therefrom and left in the lock, thereby permitting only the key having the complementary portion capable of operation in said lock.

2. As an article of manufacture, a key comprising projections one of which is provided with an extension connected with the body portion of the key by a relatively thin frangible part adapted to permit the same to be severed and left in the lock.

3. A key particularly adapted for use on switch locks comprising a body portion and a plurality of members extending therefrom, one of said members being provided with an extension connected therewith by a relatively small frangible web whereby the extension may be broken off and left in the lock.

4. The combination with a lock having a key-way, partially filling said key-way to prevent the operation of the lock by means of a key of normal size adapted to fit said lock when unobstructed, of a key having a reduced portion adapted to act in complementary relation with said means and to operate said lock.

In testimony whereof I affix my signature in the presence of two witnesses.

DAVID L. WINTERS.

Witnesses:
F. L. BROWNE,
K. E. KLEIN.

Copies of this patent may be obtained for five cents each, by addressing the "Commissioner of Patents, Washington, D. C."

It is hereby certified that in Letters Patent No. 1,277,164, granted August 27, 1918, upon the application of David L. Winters, of Philadelphia, Pennsylvania, for an improvement in "Keys," an error appears in the printed specification requiring correction as follows: Page 2, line 25, claim 4, before the word "partially" insert the word *means;* and that the said Letters Patent should be read with this correction therein that the same may conform to the record of the case in the Patent Office.

Signed and sealed this 8th day of October, A. D., 1918.

[SEAL.]

R. F. WHITEHEAD,
*Acting Commissioner of Patents.*

Cl. 70—9.